Nov. 27, 1962  G. E. GRIMES  3,065,774
DEVICE FOR INFLATING OBJECTS
Filed Dec. 13, 1960
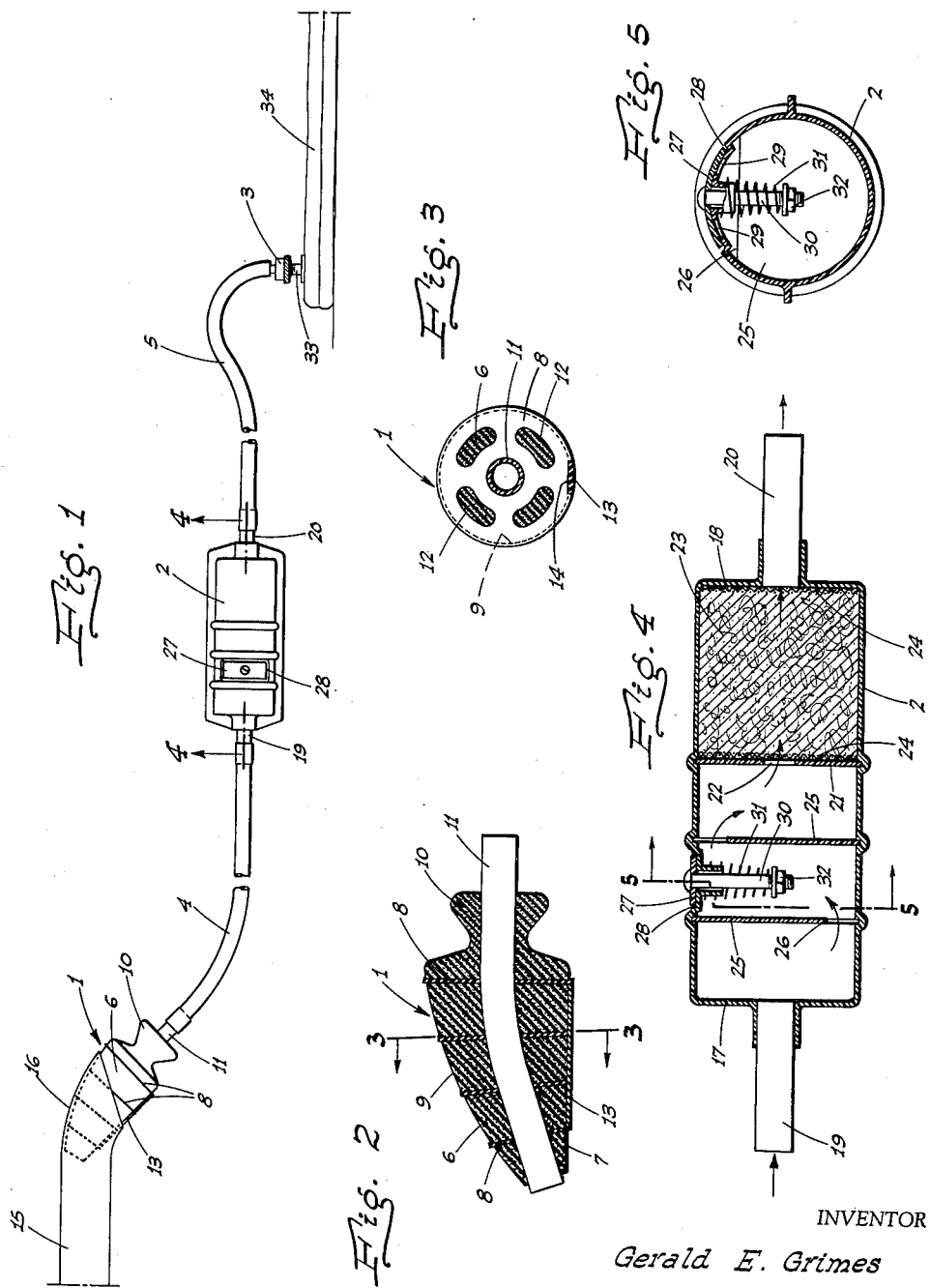
INVENTOR
Gerald E. Grimes
BY Webster & Webster
ATTORNEYS

United States Patent Office 3,065,774
Patented Nov. 27, 1962

3,065,774
DEVICE FOR INFLATING OBJECTS
Gerald E. Grimes, 2682 Los Amigos Drive,
Rancho Cordova, Calif.
Filed Dec. 13, 1960, Ser. No. 75,505
4 Claims. (Cl. 141—38)

This invention relates to a device for inflating various objects, such as rubber mattresses, boats, and other flotation devices, from the exhaust gas of a motor vehicle.

One of the objects of this invention is to provide a device for the purpose, adapted to extend from the exhaust or tail pipe of a motor vehicle engine to the object to be inflated, which on one end has a tubular member shaped to engage the end of the exhaust pipe in fitting relation, irrespective of the size (within reason) or the configuration of such end of the pipe.

Further objects of the invention are to provide a means in the device for holding back any foreign matter which may be mingled with the gas and prevent the same from passing into the object being inflated; means to automatically prevent over-inflation of the object and a "killing" of the vehicle engine which might accompany an excess of pressure within the device and object; and means to filter or purify the the lethal CO gas passing through the device into the object—all of the above named means being incorporated in a single body included with the device intermediate its ends.

It is also an object of the invention to provide a device for inflating objects which is designed for ease and economy of manufacture.

Still another object of the invention is to provide a practical, reliable, and durable device for inflating objects, and one which will be exceedingly effective for the purpose for which it is designed.

These objects are accomplished by means of such structure and relative arrangement of parts as will fully appear by a perusal of the following specification and claims.

In the drawings:

FIG. 1 is a foreshortened elevation of the device as connected to an exhaust pipe and a rubber mattress to be inflated.

FIG. 2 is an enlarged sectional elevation of the exhaust pipe engaging plug of the device.

FIG. 3 is a cross section of the plug on line 3—3 of FIG. 2.

FIG. 4 is an enlarged longitudinal section of the baffling, pressure relieving and filtering member of the device.

FIG. 5 is a cross section of said member on line 5—5 of FIG. 4.

Referring now more particularly to the drawings, and to the characters of reference marked thereon, the device consists essentially of a tubular exhaust pipe plug at one end and indicated generally at 1; an intermediate body or tubular unit 2 which contains the baffling, pressure relieving and filtering means later described; a fitting 3 at the other end to connect the device to the valve stem of the object to be inflated; a flexible hose 4 of any suitable length connecting the plug 1 and one end of body 2; and another flexible hose 5 of any suitable length connecting the other end of the body 2 and the fitting 3.

The plug 1 is of circular form in cross section and tapers from end to end, and comprises a body 6 of foam rubber or the like. At one point in its circumference the edge of the body is straight from end to end, as shown at 7, and is engaged by the edges of a plurality of relatively hard rubber rib forming discs 8 extending through the body and spaced apart lengthwise thereof. The discs are of gradually increasing diameters from one end of the body 6 to the other, as shown, and are disposed substantially at right angles to said edge 7, with their centers lying in a common plane 1 radially of the body from said edge 7.

The peripheral surface of the body 6, other than said edge 7 thereof, is convexly curved from end to end of the body, as at 9, the curving surface being slightly inwardly of the peripheral edges of the discs 8, as shown. The body 6 includes a finger or hand knob 10 projecting from the large end of the body centrally thereof.

A relatively rigid tube 11 extends through the body from end to end and centrally thereof and of the discs 8; the tube projecting beyond the knob 10 some distance for coupling engagement with one end of hose 4. In order to tie or connect the body sections between the various discs, the latter are provided with openings 12 radially out from the central tube 11, as shown in FIG. 3, through which the body material flows when the plug is being molded or formed.

A reinforcing strip 13 of relatively hard rubber extends along the straight edge 7 of the body the full distance between the endmost ones of the discs, as shown in FIG. 2; the intermediate ones of the discs being notched to receive the strip 13, as shown at 14 in FIG. 3.

By reason of this specific shape of the plug, it will not only fit into straight tail pipe ends of various sizes, but into those tail pipe ends 15, the upper wall of which is formed with a downward curvature, as shown at 16 in FIG. 1. With such pipe ends, the longitudinal curvature 9 of the plug body generally follows the internally concave curvature 16 of the pipe end, while the straight edge 7 engages in the lower and relatively straight or internally convexly curved lower edge of the pipe end. The reinforcing strip 13 in such cases prevents the soft rubber of the body 6 from being lacerated at the adjacent lower edge of the pipe end.

The hard rubber discs, projecting as they do from the body 6, provide a sealing grip with the wall of the pipe so that the plug is not so liable to slip or be pushed out by reason of the gas pressure in the pipe behind the plug.

The intermediate body 2 is a hollow member of cylindrical form; said body including an end wall 17 at the end thereof nearest plug 1, and a similar wall 18 at the other end of the body. Short lengths 19 and 20 of rigid tubing are secured in and project outwardly from the end walls 17 and 18, respectively, for connection to the corresponding ends of the hoses 4 and 5, respectively; said tubing being the same size as the tube 11 of the plug 1.

Secured in the body 2 some distance back from the end wall 18 is a cross partition 21 having a central opening 22 therethrough. The space between the partition forms a compartment filled with a filter cartridge 23 which consists of suitable material, such as a half-and-half mixture of activated charcoal and silica gel, both of a size which will not pass through 30-mesh screens 24 which are set in said compartment across the end openings thereof.

Between the partition 21 and the end wall 17 a pair of spaced baffle discs 25 are mounted in the body 2, a chordal portion of each disc being removed therefrom in opposed relation, as shown at 26. These baffle discs serve to stop certain impurities such as water, rust, carbon, etc., which may be mingled with the gas entering the body, from passing through opening 22 and into the filter compartment.

An arcuate valve-forming strip 27 normally seats in an arcuate recess 28 formed in the wall of the body 2 between the baffles; said strip covering openings 29 in the wall. A stem 30 is secured to the valve strip centrally between its ends and projects into the body 2 radially thereof; a compression spring 31 being disposed about the stem and bearing at one end against the inner face of the body wall and at the other end against an adjustable stop 32 on the stem; any adjustment of the stem being made—so that a predetermined pressure will be resisted—before the device is assembled.

In operation, with the engine of the vehicle stopped at the time, the plug 1 is pressed into the end of the tail pipe 15, and the fitting 3 is coupled to the valve stem 33 of the object, here indicated as being an air mattress 34, to be inflated. The engine is then started and run at a relatively slow speed until the desired amount of pressure has been obtained, or until the pressure begins to be relieved by the opening of the valve strip 27.

In order to empty the body 2 of any water etc. which may have accumulated therein it is only necessary to disconnect the hose from the tube 19 and tilt the body 2 so that the water etc. therein may drain through said tube.

From the foregoing it will be readily seen that there has been produced such a device as will substantially fulfill the objects of the invention, as set forth herein.

While this specification sets forth in detail the present and preferred construction of the device, still in practice such deviations from such detail may be resorted to as do not form a departure from the spirit of the invention, as defined by the appended claims.

Having thus described the invention, the following is claimed as new and useful, and upon which Letters Patent are desired:

1. A device for inflating an object having a valve stem with the exhaust gas emerging from the tail pipe of an internal combustion engine, said device comprising a tubular unit which includes an element at one end for connection with said valve stem, a second element at the other end of the tubular unit, and a tubular taper plug connected to said second element for wedging engagement into the tail pipe; said plug comprising a body of cushion material and of circular form in cross section, said body having a straight longitudinal peripheral edge of narrow circumferential extent from end to end and the remaining longitudinal peripheral portion of the body being convexly curved from end to end.

2. A device for inflating an object having a valve stem with the exhaust gas emerging from the tail pipe of an internal combustion engine, said device comprising a tubular unit which includes an element at one end for connection with said valve stem, a second element at the other end of the tubular unit, and a tubular taper plug connected to said second element for wedging engagement into the tail pipe; said plug comprising a body of cushion material and of circular form in cross section and including a plurality of circular discs of relatively stiff but yieldable material spaced lengthwise of and embedded in the body material transversely thereof and of increasing diameters from end to end of the body, said discs projecting slightly out from the peripheral surface of the cushion material.

3. A device, as in claim 1, the body including a plurality of circular discs of increasing diameters from end to end of the body and of relatively stiff but yieldable material spaced lengthwise of and extending transversely of the body from said straight edge and embedded in the cushion material, said discs being disposed substantially at right angles to said straight edge and projecting slightly out from the periphery of the cushion material, and a reinforcing strip of relatively stiff material extending lengthwise of the body along said straight edge between the endmost ones of the discs and recessed into the intermediate ones of said discs.

4. A device, as in claim 2, in which the discs are provided with openings therethrough through which the body material projects in filling and anchoring relation.

References Cited in the file of this patent

UNITED STATES PATENTS

| | | |
|---|---|---|
| 1,867,325 | Neville | July 12, 1932 |
| 1,970,629 | Scott | Aug. 21, 1934 |
| 2,058,118 | White | Oct. 20, 1936 |
| 2,495,092 | Cox et al. | Jan. 17, 1950 |
| 2,653,747 | Maida | Sept. 29, 1953 |
| 2,755,968 | Fiant | July 24, 1956 |

FOREIGN PATENTS

| | | |
|---|---|---|
| 499,688 | Italy | Nov. 15, 1954 |